(12) United States Patent
Shintani et al.

(10) Patent No.: US 8,891,003 B2
(45) Date of Patent: Nov. 18, 2014

(54) IMAGING APPARATUS INCLUDING HOT SHOE

(75) Inventors: Dai Shintani, Osaka (JP); Koichiro Murata, Osaka (JP); Takahiro Ikeda, Osaka (JP)

(73) Assignee: Panasonic Corporation, Osaka (JP)

( * ) Notice: Subject to any disclaimer, the term of this patent is extended or adjusted under 35 U.S.C. 154(b) by 29 days.

(21) Appl. No.: 13/608,319

(22) Filed: Sep. 10, 2012

(65) Prior Publication Data

US 2013/0258179 A1   Oct. 3, 2013

(30) Foreign Application Priority Data

Mar. 27, 2012  (JP) .................................. 2012-070791

(51) Int. Cl.
*H04N 5/222*     (2006.01)
*H04N 5/232*     (2006.01)
*H04N 5/225*     (2006.01)

(52) U.S. Cl.
CPC ......... *H04N 5/23209* (2013.01); *H04N 5/2251* (2013.01)
USPC ....................................................... 348/371

(58) Field of Classification Search
CPC ........... G03B 17/566; G03B 2215/056; H04N 5/2251; H04N 5/23209; H04N 5/23293
USPC ................................................ 348/370, 371
See application file for complete search history.

(56) References Cited

U.S. PATENT DOCUMENTS

| | | | | |
|---|---|---|---|---|
| 7,633,547 B2* | 12/2009 | Watanabe et al. | ............. | 348/371 |
| 7,775,575 B2* | 8/2010 | Clark | ............... | 296/56 |
| 8,364,031 B2* | 1/2013 | Geffert et al. | ................. | 396/164 |
| 2005/0088569 A1* | 4/2005 | Fu et al. | ........................ | 348/371 |
| 2008/0106630 A1* | 5/2008 | Matsuda et al. | ......... | 348/333.01 |
| 2009/0190002 A1* | 7/2009 | Tamura | .................... | 348/231.99 |
| 2010/0209089 A1* | 8/2010 | King | ............... | 396/56 |
| 2011/0122262 A1* | 5/2011 | Shinozaki et al. | ....... | 348/207.11 |
| 2011/0298970 A1* | 12/2011 | Shinohara et al. | ............ | 348/373 |
| 2012/0127361 A1* | 5/2012 | Clark | ........................... | 348/371 |

FOREIGN PATENT DOCUMENTS

| | | | |
|---|---|---|---|
| JP | 2003-337374 A | 11/2003 | |
| JP | 2006-162738 A | 6/2006 | |
| JP | 2006-229276 A | 8/2006 | |

* cited by examiner

*Primary Examiner* — Aung S Moe
*Assistant Examiner* — Amy Hsu
(74) *Attorney, Agent, or Firm* — Renner, Otto, Boisselle & Sklar, LLP

(57) ABSTRACT

An imaging apparatus includes a hot shoe to which one of a plurality of peripheral devices including an external strobe is selectively attachable. The imaging apparatus further includes a USB controller, a flash controller configured to output a flash control signal for controlling the external strobe, and a video signal controller configured to output a video signal. An apparatus-side connector to be electrically connected to a peripheral-side connector provided in a corresponding one of the peripheral devices upon attachment of the corresponding one of the peripheral devices to the hot shoe is provided in an inner region of the hot shoe or an adjacent region outside the hot shoe. The apparatus-side connector includes a USB terminal, a flash terminal, and a video terminal.

8 Claims, 13 Drawing Sheets

IMAGING APPARATUS INCLUDING HOT SHOE

CROSS-REFERENCE TO RELATED APPLICATION

This application claims priority to Japanese Patent Application No. 2012-070791 filed on Mar. 27, 2012, the disclosure of which including the specification, the drawings, and the claims is hereby incorporated by reference in its entirety.

BACKGROUND

The technique disclosed herein relates to an imaging apparatus which is capable of shooting a still image or a moving image, and particularly relates to an imaging apparatus including a hot shoe to which an external strobe is attached.

Japanese Patent Publication No. 2006-229276 discloses a method for obtaining information from an external sensor in an imaging apparatus such as a digital camera or a video camera. In the method described in Japanese Patent Publication No. 2006-229276, a communication device including various sensors is attached to a general-purpose hot shoe (also called an "accessory shoe") of the imaging apparatus. In the imaging apparatus, a circuit configured to supply a signal(s) to an X-sync contact (flash synchronization contact) of the hot shoe and a serial communication terminal is not necessarily designed to have a special circuit configuration, and the imaging apparatus can obtain sensor information at low cost by receiving a signal(s) from the sensors of the communication device through a general-purpose USB terminal or by, after conversion of a signal(s) from the sensors of the communication device into an AV signal(s), receiving the signal(s) through an AV terminal.

Japanese Patent Publication No. 2006-162738 discloses a configuration in which an external strobe is attachable to a portable phone including an imager, and a function to control the external strobe by using a general-purpose USB terminal. In such a portable phone system, a standardized signal(s) is transmitted to the external strobe through a general-purpose interface (e.g., USB or IEEE1394) in order to enhance the versatility of the external strobe.

SUMMARY

However, for the digital camera or the video camera disclosed in Japanese Patent Publication No. 2006-229276, it is necessary to provide the general-purpose USB terminal in addition to the general-purpose hot shoe. In such a case, a connection between the imaging apparatus and the communication device through a cable(s) is required. The connection through the cable(s) not only provides an impression of inconvenience to a user, but causes the user to consider error-handling scenarios and the possibility of damage of the cable(s) on all occasions. For the connection through the AV terminal, it is necessary to consider conversion of a signal(s) into an AV signal(s) in addition to the issues relating to the connection through the cable(s) as in the connection through the USB terminal. Thus, a special conversion circuit is required. This may result in, e.g., a cost increase or a circuit size increase, and therefore there is a possibility to depart from an intended purpose.

For the portable phone system disclosed in Japanese Patent Publication No. 2006-229276, it is necessary that digital signals to be transmitted/received such as control signals are standardized among portable phone manufacturers. However, each manufacturer can appeal the strength thereof by introducing, under a specification based on each manufacturer's own ideas and concepts, a color temperature of strobe light, slow synchronization, fill-in flash, and a light emission mode such as a red-eye reduction light emission mode upon image shooting using a strobe. Thus, the standardization among manufacturers is not helpful, and it is obvious that it is difficult to set a specification for the standardization.

The present disclosure provides an imaging apparatus including a hot shoe. In the imaging apparatus, a unique control signal(s) is used in combination with a general-purpose standardized system. Thus, the versatility of the imaging apparatus is extremely high, and no inconvenience is caused to a user. In addition, a cost for the imaging apparatus is low, and future system expansion for the imaging apparatus can be facilitated.

In one general aspect, an imaging apparatus of the present disclosure has the following configuration, and includes a hot shoe to which one of a plurality of peripheral devices (accessory units) including an external strobe is selectively attachable.

That is, the imaging apparatus includes a USB controller which is operable as a USB host; a flash controller configured to output a flash control signal for controlling the external strobe; and a video signal controller configured to output a video signal. An apparatus-side connector to be electrically connected to a peripheral-side connector provided in a corresponding one of the peripheral devices upon attachment of the corresponding one of the peripheral devices to the hot shoe is provided in an inner region of the hot shoe or an adjacent region outside the hot shoe. The apparatus-side connector includes a USB terminal connected to the USB controller and receiving a signal from the USB controller, a flash terminal connected to the flash controller and receiving a flash control signal from the flash controller, and a video terminal connected to the video signal controller and receiving a video signal from the video signal controller.

According to the foregoing configuration, when a user attaches the peripheral device to the hot shoe, the apparatus-side connector and the peripheral-side connector are electrically connected together, and therefore the imaging apparatus and the peripheral device are in an electrical connection with each other. In the peripheral-side connector, a terminal(s) to be connected to at least one of the USB terminal, the flash terminal, and the video terminal may be provided depending on use of the peripheral device.

As in a general-purpose USB terminal, the USB terminal can be used for transmitting/receiving a signal(s) to/from the peripheral device and for supplying power from a camera body to the peripheral device. Even if the peripheral device is not the external strobe, the flash terminal can be used for communication between the camera body and the peripheral device. By using the flash terminal, the camera body can be controlled by the peripheral device, and vice versa. The video terminal can be used for transmitting a video signal(s) from the camera body to the peripheral device.

According to the technique disclosed herein, various peripheral devices which are capable of being controlled by the imaging apparatus or controlling the imaging apparatus can be employed. For example, wireless communication through WiFi is used to realize the followings: a shooting control of one or more imaging apparatuses by another imaging apparatus; a display of an image on a monitor of, e.g., a PC camera; input of characters to an imaging apparatus through a keyboard; and a control of zooming of an optical finder of an imaging apparatus. For newly-proposed peripheral devices, lower compatibility is allowed by firmware update of driver software, and a user can enjoy using the new peripheral devices on all occasions.

Thus, the versatility of the imaging apparatus is extremely high, and no inconvenience is caused to a user. In addition, a cost for the imaging apparatus is low, and future system expansion for the imaging apparatus can be facilitated.

DETAILED DESCRIPTION

An example embodiment will be described below in detail with reference to drawings. Note that the example embodiment described below will be set forth merely for the purpose of an example in nature, and the present disclosure is not limited to the embodiment.

(Configuration of Camera System)

Figure 1:
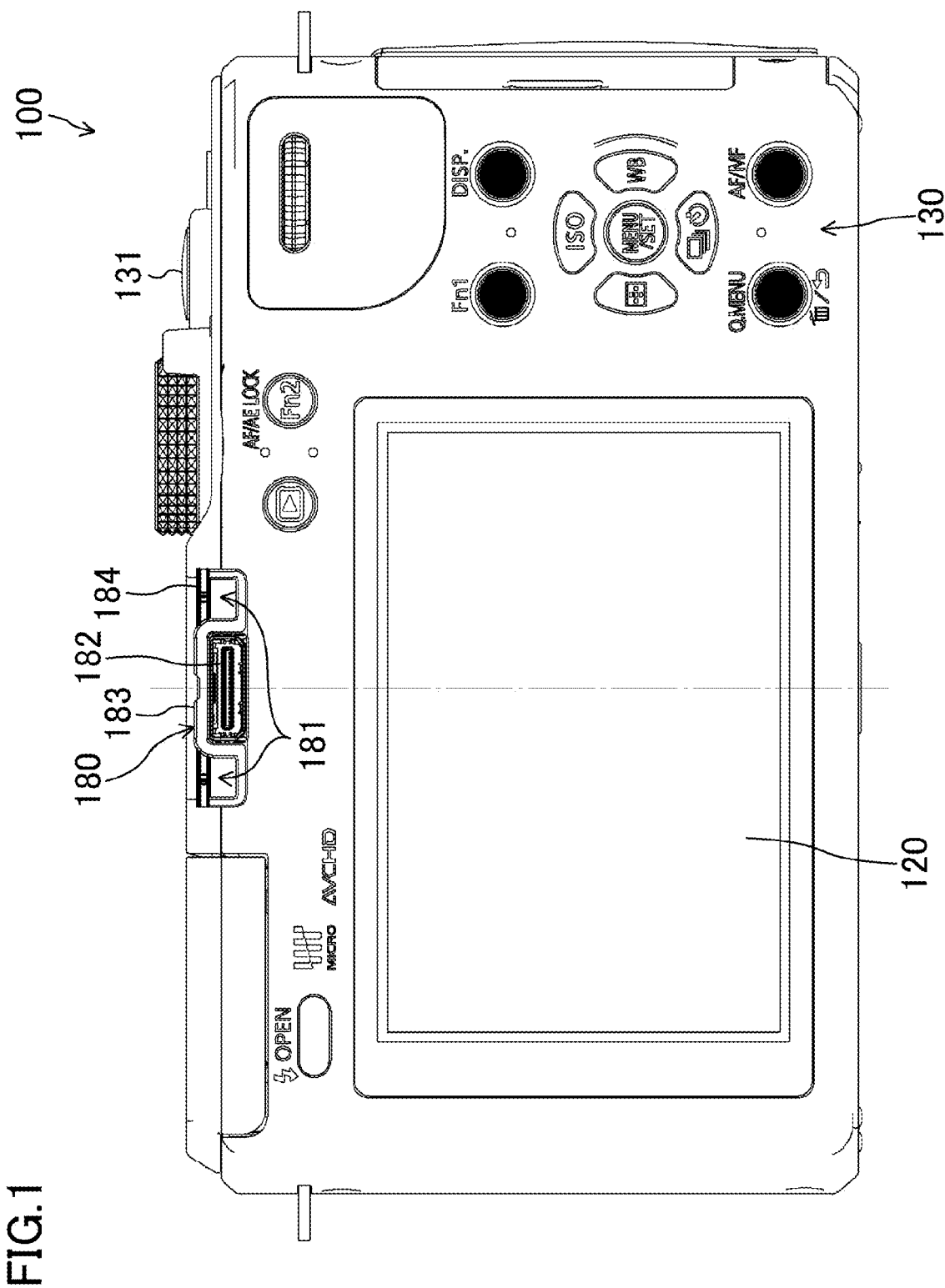
FIG. 1 is a back view of a camera body of a camera system which is an imaging apparatus of an example embodiment.
Figure 2:
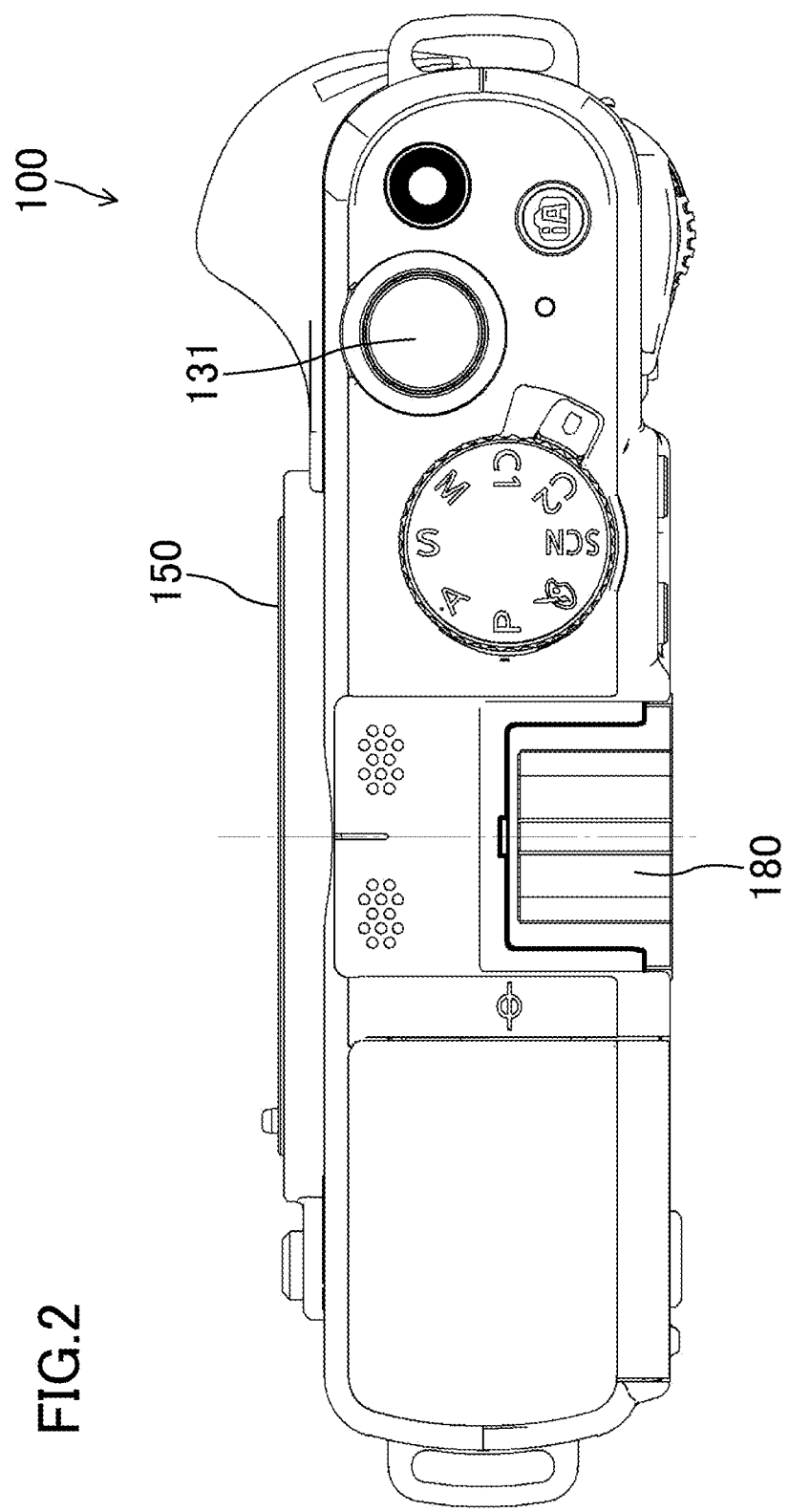
FIG. 2 is a plan view of the camera body.
Figure 3:
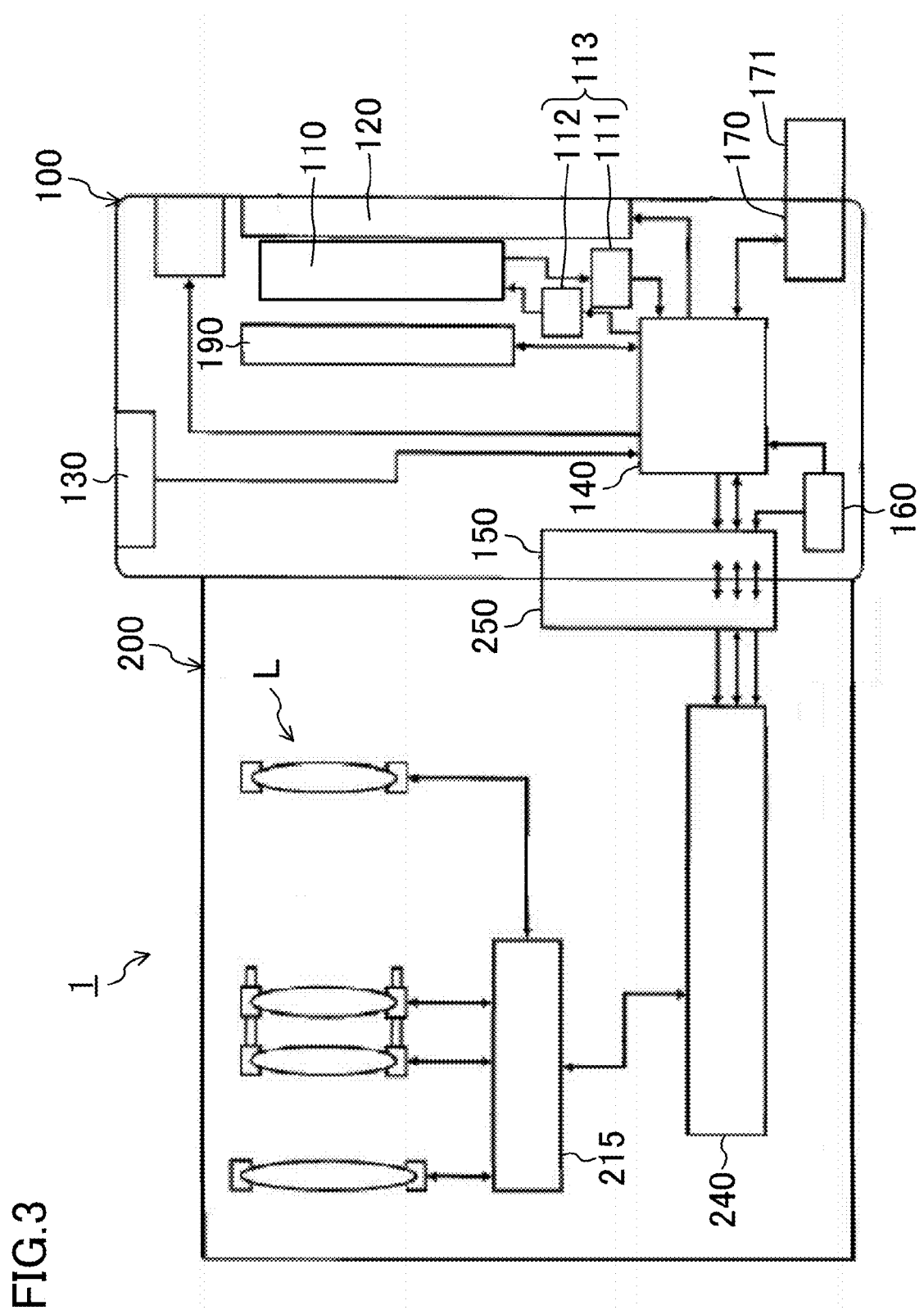
FIG. 3 is a block diagram illustrating a configuration of the camera system.

FIG. 1 is a back view of a camera body 100 of a camera system 1 which is an imaging apparatus of the example embodiment. FIG. 2 is a plan view of the camera body 100. FIG. 3 is a block diagram illustrating a configuration of the camera system 1. In the camera system 1, a right-left direction as viewed in FIG. 3 is hereinafter referred to as a "camera front-back direction." In addition, a left side (side closer to a lens unit 200) as viewed in FIG. 3 is hereinafter referred to as a "camera front side," and a right side as viewed in FIG. 3 is hereinafter referred to as a "camera rear side." Further, a right-left direction as viewed in FIGS. 1 and 2 is hereinafter referred to as a "camera right-left direction."

The camera system 1 includes the camera body 100 and the lens unit 200 including an optical system L having a plurality of lenses supported by a lens barrel. The camera body 100 is an interchangeable lens type digital camera. The lens unit 200 is attachable to a body mount 150 of the camera body 100 at a lens mount 250 of the lens unit 200. The imaging apparatus may be an imaging apparatus other than the camera system 1 of the present example embodiment, e.g., a non-interchangeable type camera in which a lens unit is integrally provided with a camera body.

The camera body 100 mainly includes a complementary metal oxide semiconductor (CMOS) image sensor 110, a CMOS circuit board 113, a camera monitor 120, an operator 130, a camera controller 140, the body mount 150, a power supply 160, a card slot 170, and a focal plane shutter device 190.

The CMOS image sensor 110 is configured to convert an optical image of an object which is input through the lens unit 200, into image data. The generated image data is digitized by an AD converter 111 of the CMOS circuit board 113. The camera controller 140 applies various image processing to the image data digitized by the AD converter 111. The "various image processing" includes, e.g., gamma correction, white balance correction, defect correction, YC conversion, electronic zooming, and JPEG compression.

The CMOS image sensor 110 is operated based on a timing signal(s) generated in a timing generator 112. The CMOS circuit board 113 can control the CMOS image sensor 110 to obtain still image data and moving image data. The obtained moving image data is used for displaying a through image (live view image) on the camera monitor 120. Note that still image data and moving image data are examples of image data.

The "through image" is an image of moving image data which is not stored in a memory card 171. The through image is mainly a moving image, and is displayed on the camera monitor 120 in order to determine a composition of a moving image or a still image.

The CMOS image sensor 110 can obtain a low-resolution moving image used as the through image, and can obtain a high-resolution moving image used as an image to be stored. The high-resolution moving image includes, e.g., a moving image having an HD size (hi-vision size of 1920×1080 pixels). Note that the CMOS image sensor 110 is an example of an imaging element configured to convert an optical image of an object into an electrical image signal(s). The imaging element has, in addition to concepts of the CMOS image sensor 110, concepts of a photoelectric conversion element such as a CCD image sensor.

The CMOS image sensor 110 has an electronic leading curtain function to successively reset electric charge of pixels in a moving direction of a leading curtain blade of the focal plane shutter device 190.

The CMOS circuit board 113 is a circuit board configured to control the CMOS image sensor 110 and apply predetermined processing to image data output from the CMOS image sensor 110. The CMOS circuit board 113 includes the timing generator 112 and the AD converter 111. The CMOS circuit board 113 is an example of an imaging element circuit board configured to drive and control an imaging element and apply predetermined processing such as AD conversion to image data output from the imaging element.

The camera monitor 120 is, e.g., a liquid crystal display, and is configured to display, e.g., an image corresponding to image data for display. The image data for display is generated by the camera controller 140. The image data for display is, e.g., data for displaying processed image data, shooting conditions of the camera system 1, an operation menu, etc. as an image. The camera monitor 120 is capable of selectively displaying a moving image and a still image.

The camera monitor 120 is provided in the camera body 100. In the present example embodiment, the camera monitor 120 is arranged at a back surface of the camera body 100, but may be arranged in any part of the camera body 100.

Note that the camera monitor 120 is an example of a displayer provided in the camera body 100. The displayer includes, e.g., display panels which are capable of displaying an image, such as an organic EL display panel, an inorganic EL display panel, or a plasma display panel. In addition, the displayer is not necessarily provided at the back surface of the camera body 100, and may be provided in other parts of the camera body 100, such as a side surface or an upper surface.

The operator 130 is configured to receive an operation command input by a user. Specifically, referring to FIGS. 1 and 2, the operator 130 includes the followings: a push-type release button 131 provided at the upper surface of the camera body 100 and configured to receive a user's shooting operation command including a command to actuate the focal plane shutter device 190; and various switches provided at the upper and back surfaces of the camera body 100, such as a power supply switch and a shooting mode switch. It is only necessary that the operator 130 receives the operation command input by the user, and the operator 130 includes, e.g., a button, a lever, a dial, or a touch panel.

The camera controller 140 is configured to receive a command from the operator 130 and control each section of the camera body 100. In addition, the camera controller 140 is configured to transmit a signal(s) for controlling the lens unit 200 to a lens controller 240 through the body mount 150 and the lens mount 250, and to indirectly control each section of the lens unit 200. That is, the camera controller 140 controls the entirety of the camera system 1.

The camera controller 140 is configured to control the CMOS circuit board 113. Specifically, the camera controller 140 transmits a control signal(s) to the CMOS circuit board 113, and then the CMOS circuit board 113 receives the control signal(s) and controls the CMOS image sensor 110 based on the received control signal(s). That is, the camera controller 140 controls the CMOS image sensor 110. In addition, the camera controller 140 is configured to obtain image data which is generated by the CMOS image sensor 110 and to which predetermined processing such as AD conversion is applied by the CMOS circuit board 113, and to further apply processing to the image data. For example, the camera controller 140 generates image data for display or moving image data for recording from image data processed by the CMOS circuit board 113.

The card slot 170 is configured such that the memory card 171 is attachable to the card slot 170. The card slot 170 is configured to control, based on a control signal(s) transmitted from the camera controller 140, the memory card 171 attached to the card slot 170. Specifically, the card slot 170 is configured to, based on a control signal(s) from the camera controller 140, store image data in the memory card 171 or output image data from the memory card 171. In addition, based on the control signal(s), the card slot 170 stores moving image data in the memory card 171 or output moving image data from the memory card 171.

The memory card 171 is capable of storing image data generated by image processing of the camera controller 140. For example, the memory card 171 is capable of storing a non-compressed RAW image file(s), a compressed JPEG image file(s), etc. In addition, the memory card 171 is capable of outputting image data or an image file(s) stored therein in advance to the camera controller 140 through the card slot 170. The image data or the image file(s) output from the memory card 171 to the camera controller 140 is processed by the camera controller 140. The camera controller 140 performs, e.g., processing for decompressing the image data or the image file(s) obtained from the memory card 171, thereby generating image data for display.

The memory card 171 is also capable of storing moving image data generated by image processing of the camera controller 140. The memory card 171 is capable of storing, e.g., a moving image file(s) compressed using H.264/AVC video compression standard. In addition, the memory card 171 is capable of outputting moving image data or a moving image file(s) stored therein in advance to the camera controller 140 through the card slot 170. The moving image data or the moving image file(s) output from the memory card 171 to the camera controller 140 is processed by the camera controller 140. The camera controller 140 performs, e.g., processing for decompressing the moving image data or the moving image file(s) obtained from the memory card 171, thereby generating moving image data for display.

Note that the memory card 171 is an example of a storage. The storage may be attachable to the camera body 100 as is the memory card 171, or may be fixed to the camera system 1.

The power supply 160 is configured to supply power used for the camera system 1 to each section of the camera system 1. The power supply 160 may be, e.g., a dry battery or a rechargeable battery. Alternatively, the power supply 160 may be a unit configured to receive power supplied from an external power supply through, e.g., a power supply cord, and to supply the power to the camera system 1.

The body mount 150 supports the lens unit 200 with the body mount 150 being engaged with the lens mount 250. The body mount 150 and the lens mount 250 can be electrically connected together. The camera body 100 is capable of transmitting/receiving at least one of data and a control signal(s) between the camera body 100 and the lens unit 200 through the body mount 150 and the lens mount 250.

The focal plane shutter device 190 is arranged on the camera front side relative to the CMOS image sensor 110. The focal plane shutter device 190 is switchable between the state in which the focal plane shutter device 190 blocks light directing from the optical system L of the lens unit 200 toward the CMOS image sensor 110 and the state in which the focal plane shutter device 190 allows passage of light directing from the optical system L toward the CMOS image sensor 110. The focal plane shutter device 190 is configured to control a light exposure time of the CMOS image sensor 110.

The lens unit 200 is attachable to the body mount 150 of the camera body 100, and the optical system L forms an optical image of an object on a light receiving surface of the CMOS image sensor 110. The lens unit 200 further includes a lens driver 215 configured to drive each lens of the optical system L, and the lens controller 240. The lens controller 240 is configured to control the entirety of the lens unit 200 including the lens driver 215 etc. based on a control signal(s) transmitted from the camera controller 140.

The camera body 100 is capable of continuous shooting and switching the shooting between continuous AF shooting which is performed while a contrast AF operation by the CMOS image sensor 110 continues and high-speed continuous shooting which is continuous shooting performed at extremely high speed.

During the continuous AF shooting, the focal plane shutter device 190 performs a normally-open control. During the high-speed continuous shooting, the focal plane shutter device 190 performs a normally-close control in order to increase a frame speed. This is because of the following reasons. During the normally-open control, a focal plane shutter is required to go through a so-called "open state" (state in which an opening of the focal plane shutter device 190 is opened) in which the leading curtain blade is moved and a trailing curtain blade is held in a charged state, and it requires more time to prepare for shooting as compared to the normally-close control.

(Configuration of Hot Shoe and Accessory Unit)

Figure 4:
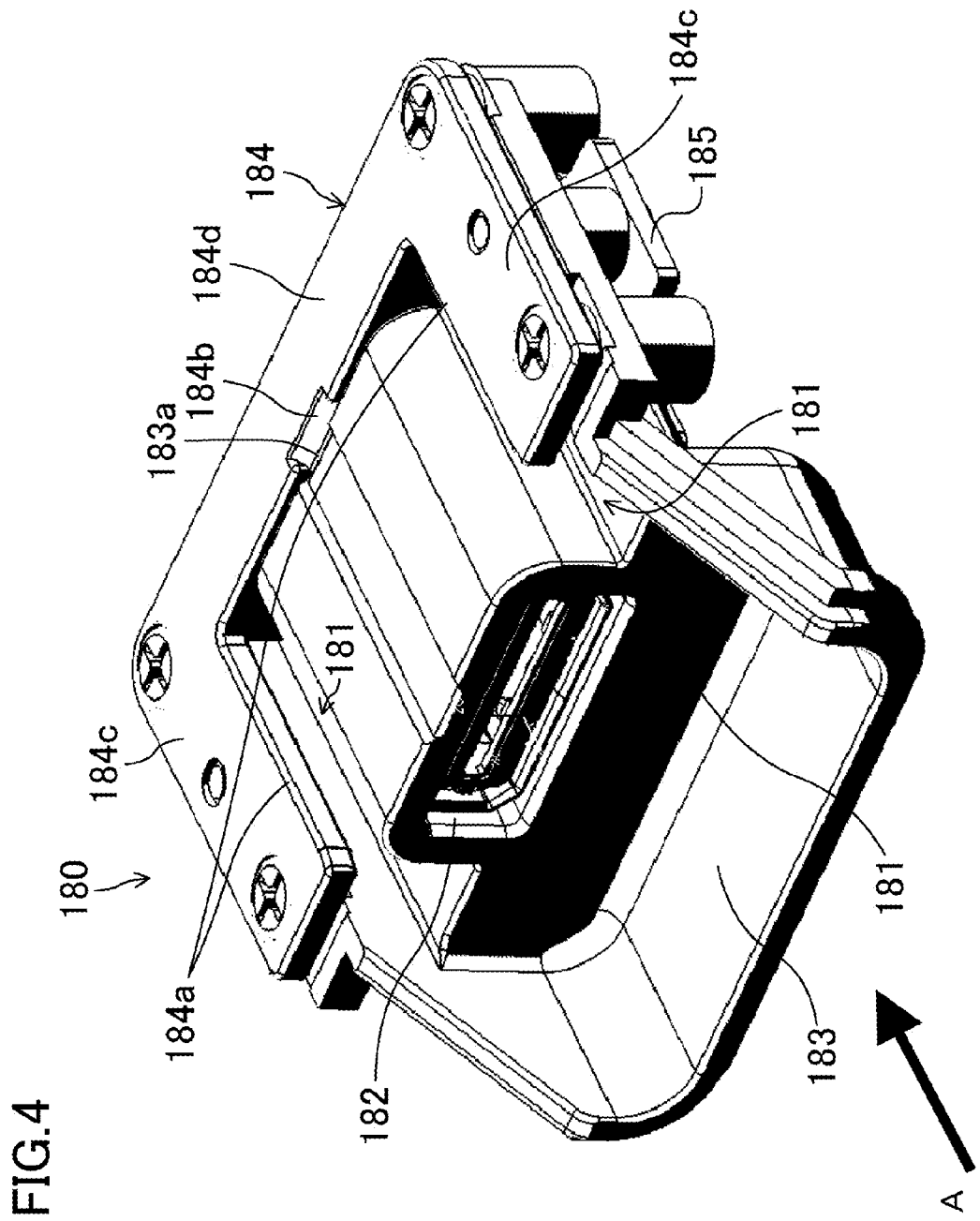
FIG. 4 is a perspective view illustrating a hot shoe of the camera body.
Figure 5:
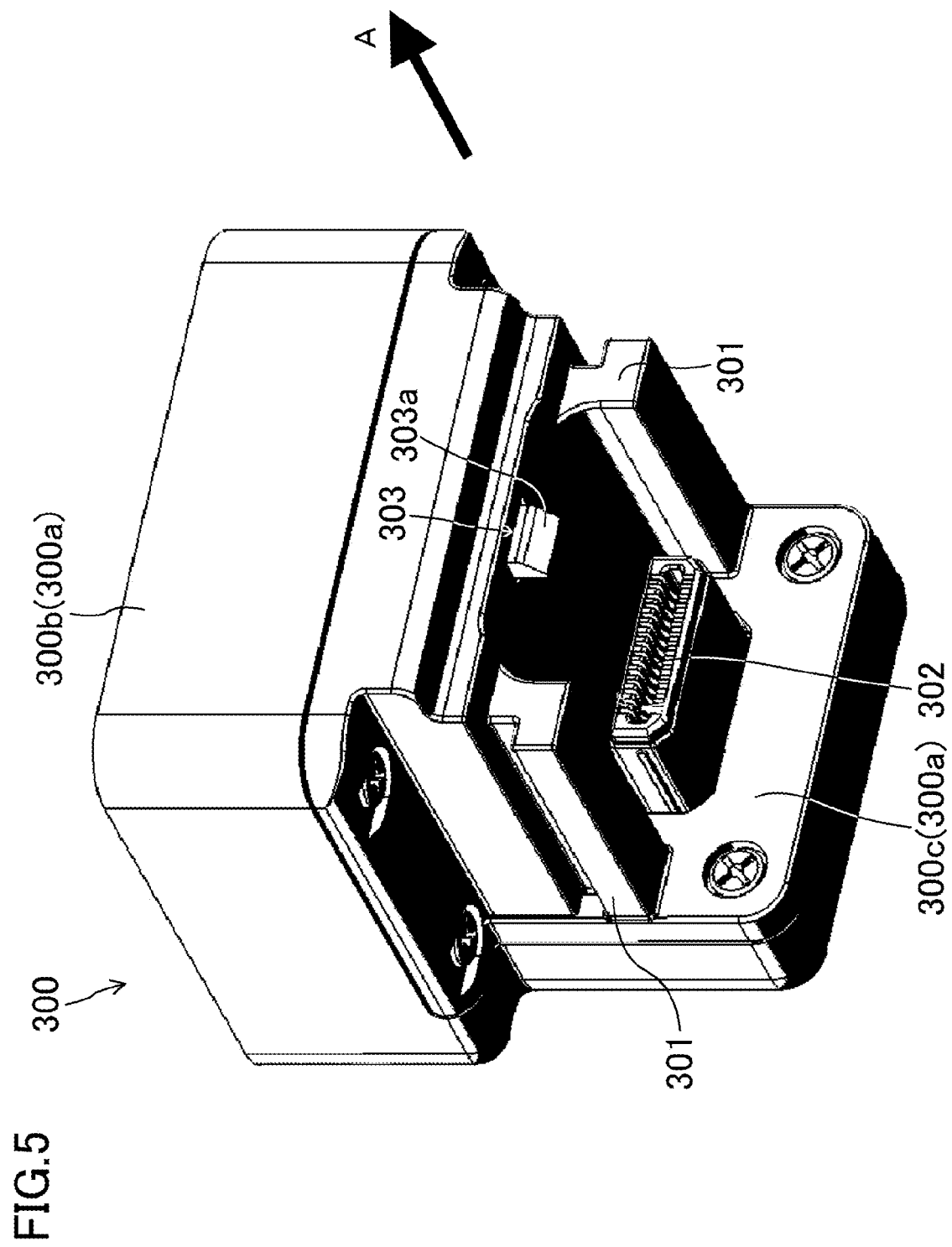
FIG. 5 is a diagonal perspective view of an accessory unit which is a peripheral device to be attached to the hot shoe, from a front side.
Figure 6:
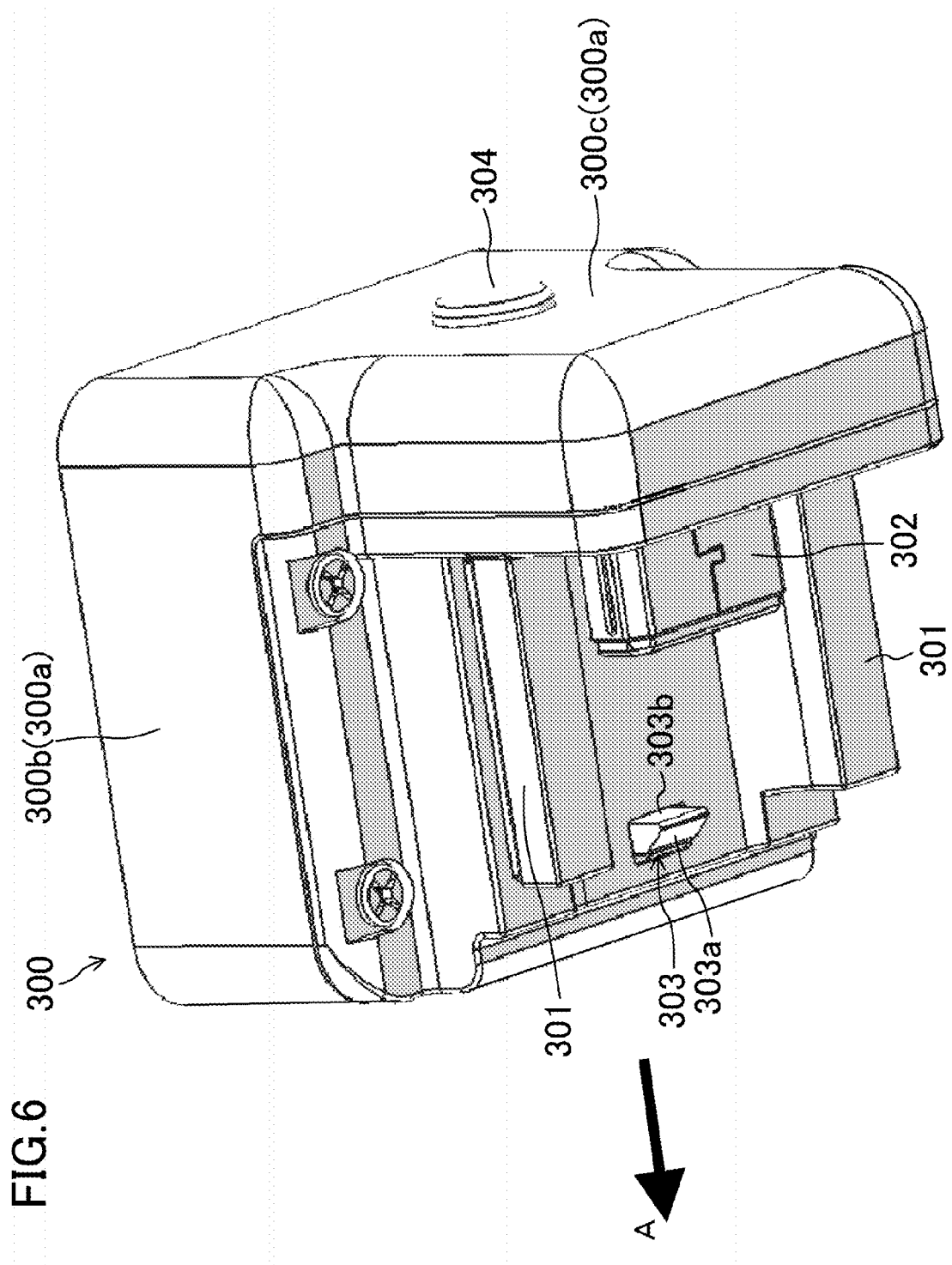
FIG. 6 is a perspective view of the accessory unit from a lower rear side.

Referring to FIGS. 4-6, configurations of a hot shoe 180 and an accessory unit 300 which is a peripheral device will be described below.

First, the configuration of the hot shoe 180 will be described.

Figure 11:
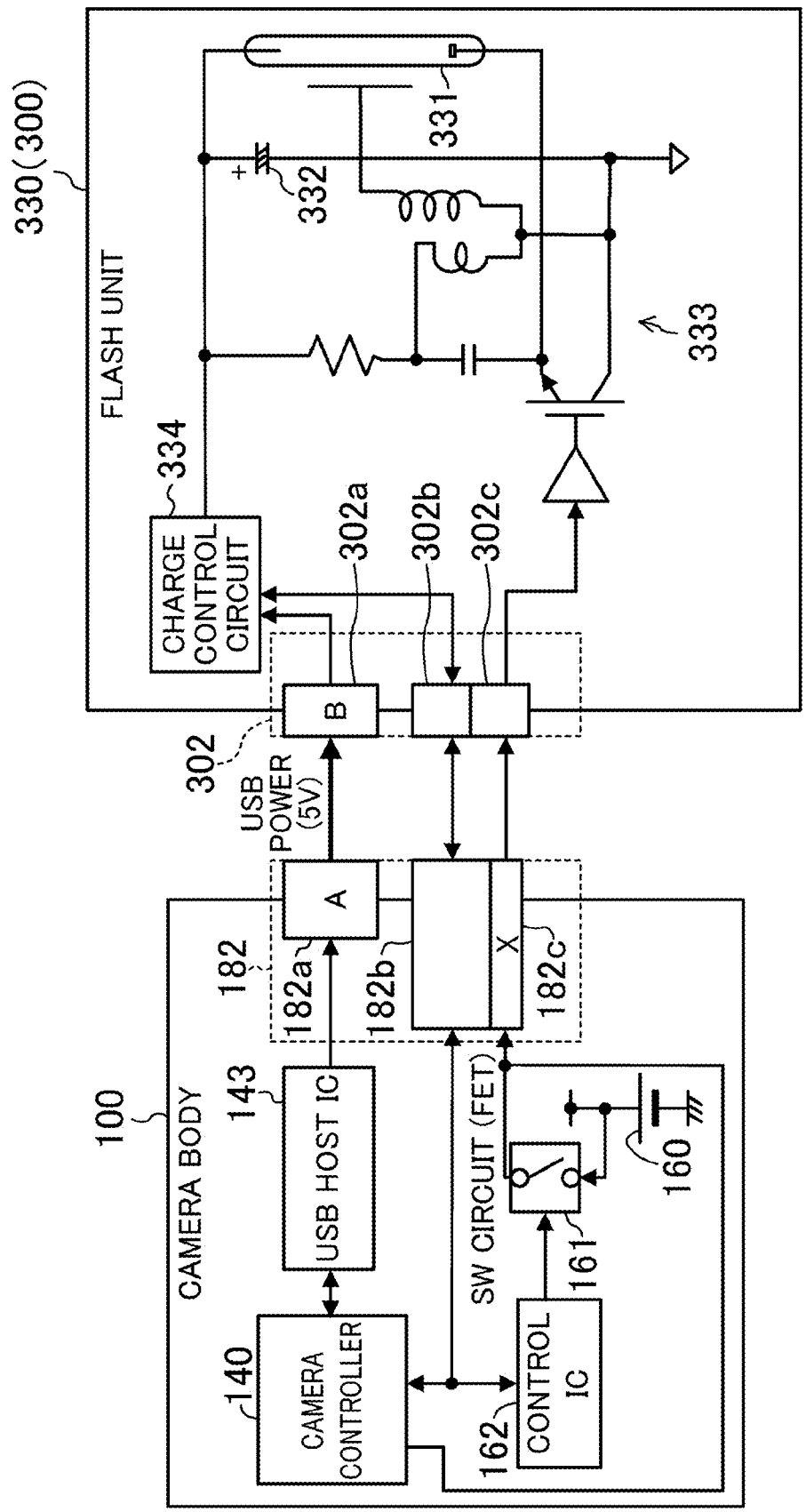
FIG. 11 is a block diagram illustrating still another circuit configuration relating to an electrical connection between the camera body and a flash unit which is still another example of the accessory unit.

FIG. 4 is a perspective view of the hot shoe 180. The hot shoe 180 is configured such that one of a plurality of accessory units 300 including a later-described flash unit (external strobe) 330 illustrated in FIG. 11 is selectively attachable to the hot shoe 180. Specific examples of the accessory units 300 will be described later.

Referring to FIG. 1, the hot shoe 180 is arranged at the upper surface of the camera body 100, and has a pair of key grooves 181 so that the accessory unit 300 can be attached to the hot shoe 180 by sliding the accessory unit 300 into the key grooves 181 from the camera rear side.

In an inner region of the hot shoe 180 (a region of the hot shoe 180 between the key grooves 181), an apparatus-side connector 182 is provided, which is electrically connected to a peripheral-side connector 302 provided in the accessory unit 300 upon the attachment of the accessory unit 300 to the hot shoe 180. The apparatus-side connector 182 has a cylindrical case opening at one end thereof, and the opening of the case faces the camera rear side. The peripheral-side connector 302 is inserted into the case through the opening thereof, and therefore the apparatus-side connector 182 and the peripheral-side connector 302 are electrically connected together.

The accessory unit 300 is configured so as to be attached to the hot shoe 180 by sliding into the hot shoe 180 from one side to the other side in a predetermined direction (in the present example embodiment, from a rear side to a front side in the camera front-back direction), and to be detached from the hot shoe 180 by sliding back toward the one side in the predetermined direction (toward the rear side in the camera front-back direction). An arrow A illustrated in FIGS. 4-6 indicates a direction in which the accessory unit 300 slides when the accessory unit 300 is attached to the hot shoe 180.

The key grooves 181 face each other in a direction (in the present example embodiment, in the camera right-left direction) perpendicular to the camera front-back direction so as to sandwich the apparatus-side connector 182, and extend in the camera front-back direction. The key grooves 181 open, on the camera rear side, so that a pair of keys 301 (see FIGS. 5 and 6) provided in the accessory unit 300 can be each inserted into the key groove 181. On the other hand, the key grooves 181 are closed on the camera front side.

Part of the apparatus-side connector 182 around the case other than the opening into which the peripheral-side connector 302 is inserted is covered by a hot shoe base (base member) 183. That is, the apparatus-side connector 182 is accommodated and arranged in an accommodation part integrally formed with the hot shoe base 183.

The hot shoe base 183 and a sheet metal (plate member) 184 form the key grooves 181. The sheet metal 184 is, as viewed in a direction (i.e., the vertical direction) perpendicular to both of a direction (camera right-left direction) in which the key grooves 181 face each other and the camera front-back direction, formed in such a shape (substantially U-shape) that the sheet metal 184 surrounds the apparatus-side connector 182 with the exception of part of the apparatus-side connector 182 on the rear side in the camera front-back direction. That is, the sheet metal 184 includes a pair of front-back extensions 184c extending in the camera front-back direction on an upper side of the key grooves 181, and a right-left extension 184d extending in the camera right-left direction to connect terminal parts of the front-back extensions 184c on the camera front side. An inner edge part 184a of each of the front-back extensions 184c forms an upper wall of the key groove 181, and the hot shoe base 183 forms right and left side walls and a bottom wall of the key groove 181.

As will be seen from FIG. 1, an upper surface in part of the hot shoe base 183 corresponding to an upper wall of the accommodation part of the apparatus-side connector 182 is positioned at the substantially same height as that of an upper surface of the sheet metal 184. In addition, the apparatus-side connector 182 is, by, e.g., soldering, directly fixed to a connector board 185 provided below the apparatus-side connector 182, and the connector board 185 is screw-fastened to the hot shoe base 183.

According to the foregoing arrangement and configuration of the hot shoe 180, the length of the key groove 181 in the vertical direction and the length of the apparatus-side connector 182 and the accommodation part thereof in the vertical direction are substantially the same, and the length of the entirety of the hot shoe 180 in the vertical direction can be reduced.

In a center part of an inner edge part of the right-left extension 184d of the sheet metal 184 in the camera right-left direction, an inclined surface 184b downwardly inclined toward the camera rear side is formed. When the attachment of the accessory unit 300 to the hot shoe 180 is completed, an inclined surface of a later-described lock member 303 of the accessory unit 300 is pressed against the inclined surface 184b. Thus, the keys 301 of the accessory unit 300 are pressed against the edge parts 184a of the front-back extensions 184c of the sheet metal 184, and, as a result, the accessory unit 300 is stably positioned on the hot shoe 180.

Next, the configuration of the accessory unit 300 will be described.

FIG. 5 is a diagonal perspective view of the accessory unit 300 from a front side thereof. FIG. 6 is a perspective view of the accessory unit 300 from a lower rear side thereof. Note that FIGS. 5 and 6 only illustrate a joint part 300a which is positioned in a lower part of the accessory unit 300 and which is to be joined to the hot shoe 180, and a main body of the accessory unit 300 is not shown. The main body is arranged on an upper side relative to the joint part 300a.

In the state in which the accessory unit 300 is attached to the hot shoe 180, the same direction as the camera front-back direction is hereinafter referred to as a "unit front-back direction." In addition, the same side as the camera front side is hereinafter referred to as a "unit front side," and the same side as the camera rear side is hereinafter referred to as a "unit rear side." Further, in the state in which the accessory unit 300 is attached to the hot shoe 180, the same direction as the camera right-left direction is hereinafter referred to as a "unit right-left direction."

The joint part 300a includes a substantially rectangular box shaped main body connection part 300b to be connected to the main body, and a downward extension 300c downwardly extending from part of a lower surface of the main body connection part 300b on the unit rear side.

The keys 301 of the accessory unit 300 are provided at the lower surface of the main body connection part 300b, and extend in the unit front-back direction with the keys 301 facing each other in the unit right-left direction. End parts of the keys 301 on the unit rear side are fixed to the downward extension 300c. The keys 301 are engaged respectively with the key grooves 181, and slide along the key grooves 181. This allows the accessory unit 300 to slide relative to the hot shoe 180 in the camera front-back direction. Upon the attachment of the accessory unit 300 to the hot shoe 180, the accessory unit 300 slides in the direction indicated by the arrow A illustrated in FIGS. 5 and 6.

The peripheral-side connector 302 protrudes from a surface (surface extending in the vertical direction and the unit right-left direction) of the downward extension 300c on the unit front side toward the unit front side, and is positioned between the keys 301 in the joint part 300a. By sliding the accessory unit 300 toward the front side in the camera front-back direction relative to the hot shoe 180, the peripheral-side connector 302 is inserted into the case of the apparatus-side connector 182 through the opening thereof, and then is electrically connected to the apparatus-side connector 182. On the other hand, by sliding the accessory unit 300 toward the rear side in the camera front-back direction, the peripheral-side connector 302 is removed from the case of the apparatus-side connector 182 through the opening thereof, and then the electrical connection between the peripheral-side connector 302 and the apparatus-side connector 182 is cleared. In order that the peripheral-side connector 302 can be inserted into the case of the apparatus-side connector 182 with component errors, attachment errors, etc. being absorbed, the peripheral-side connector 302 is configured so as to move relative to a surface of the downward extension 300c on the unit front side by a predetermined amount.

In an end part of the lower surface of the main body connection part 300b on the unit front side, the lock member 303 is provided between the keys 301 so as to move in the vertical direction. As will be seen from FIG. 6, part of the lock member 303 on the unit front side forms the inclined surface 303a corresponding to the inclined surface 184b of the sheet metal 184, and part of the lock member 303 on the unit rear side forms the vertical surface 303b. The lock member 303 is downwardly biased so as to downwardly protrude from the lower surface of the main body connection part 300b by a spring which is not shown in the figure. Thus, when the attachment of the accessory unit 300 to the hot shoe 180 is completed, the inclined surface 303a of the lock member 303 presses against the inclined surface 184b, and the vertical surface 303b of the lock member 303 is engaged with an end surface of the accommodation part of the hot shoe base 183 on the camera front side (engaged with part of the hot shoe base 183 facing the inclined surface 184b on the camera rear side). As described above, in such a manner that the inclined surface 303a of the lock member 303 presses against the inclined surface 184b, the keys 301 of the accessory unit 300 are pressed against the edge parts 184a of the front-back extensions 184c of the sheet metal 184, and then the accessory unit 300 is stably positioned on the hot shoe 180. In addition, in such a manner that the vertical surface 303b of the lock member 303 is engaged with the hot shoe base 183, an attachment state of the accessory unit 300 to the hot shoe 180 is maintained.

The lock member 303 is configured such that a user presses an unlock button 304 provided on a surface of the downward extension 300c on the unit rear side to pull the lock member 303 into the main body connection part 300b. Thus, in order to detach the accessory unit 300 from the hot shoe 180, the user may slide the accessory unit 300 in a direction opposite to the direction indicated by the arrow A while pressing the unlock button 304.

(Circuit Configuration)

Figure 7:
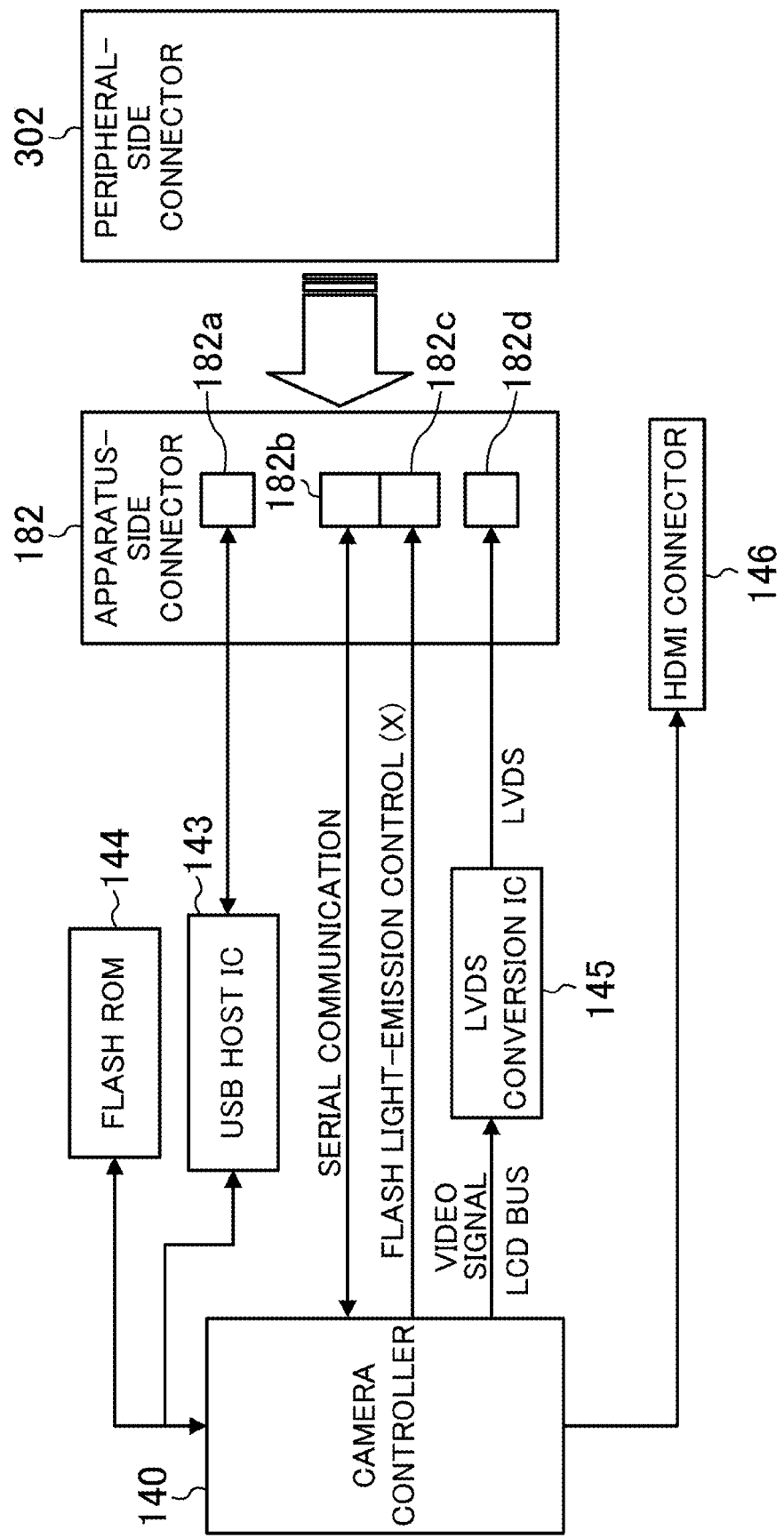
FIG. 7 is a block diagram illustrating a circuit configuration relating to an electrical connection between the camera body and the accessory unit.

FIG. 7 illustrates a circuit configuration relating to an electrical connection between the camera body 100 and the accessory unit 300.

The camera controller 140 functions as a flash controller configured to output a flash control signal(s) for controlling the flash unit 330 (see FIG. 11) and a video signal controller configured to output a video signal(s). In addition, the camera controller 140 is configured to control an operation of a USB host IC 143 (equivalent to a USB controller) which is operable as a USB host, depending on driver software stored in a flash ROM 144.

The apparatus-side connector 182 of the hot shoe 180 includes a USB terminal 182a connected to the USB host IC 143 and receiving a signal(s) from the USB host IC 143 and USB power (5V), flash terminals 182b, 182c connected to the camera controller 140 and receiving a flash control signal(s) from the camera controller 140, and a video terminal 182d connected to the camera controller 140 and receiving a video signal(s) from the camera controller 140.

The camera controller 140 and the flash terminal 182b are connected together through a serial communication signal line. In addition, the camera controller 140 and the flash terminal 182c are connected together through a flash light-emission control line for supplying a flash light-emission control signal(s) from the camera controller 140 to the flash terminal 182c. That is, the flash terminal 182c functions as an X-sync contact.

The camera controller 140 and the video terminal 182d are connected together through an LVDS conversion IC 145. The LVDS conversion IC 145 is configured to convert a parallel video signal(s) output from the camera controller 140 through an LCD bus into a serial video signal(s) and supply the serial video signal(s) to the video ten final 182d. Thus, a video signal(s) to be supplied to the video terminal 182d is a video signal(s) for which the serial conversion is performed.

In the camera body 100, an HDMI connector 146 is provided in addition to the apparatus-side connector 182. An HDMI video signal(s) is supplied from the camera controller 140 to the HDMI connector 146. By connecting a cable to the HDMI connector 146, the camera body 100 and, e.g., a television set can be connected together through the cable.

The camera controller 140 functioning as the flash controller is configured to receive a type signal(s) which is a signal(s) initially output after the attachment of the accessory unit 300 to the hot shoe 180, from the accessory unit 300 through the flash terminal 182b and the serial communication signal line. The camera controller 140 identifies the type of the accessory unit 300 attached to the hot shoe 180 by receiving a type signal(s) which is a signal(s) initially output to the camera controller 140.

The flash terminal 182b and the serial communication signal line can be used for transmitting/receiving various communication signals between the camera body (camera controller 140) and the accessory unit 300.

Figure 8:
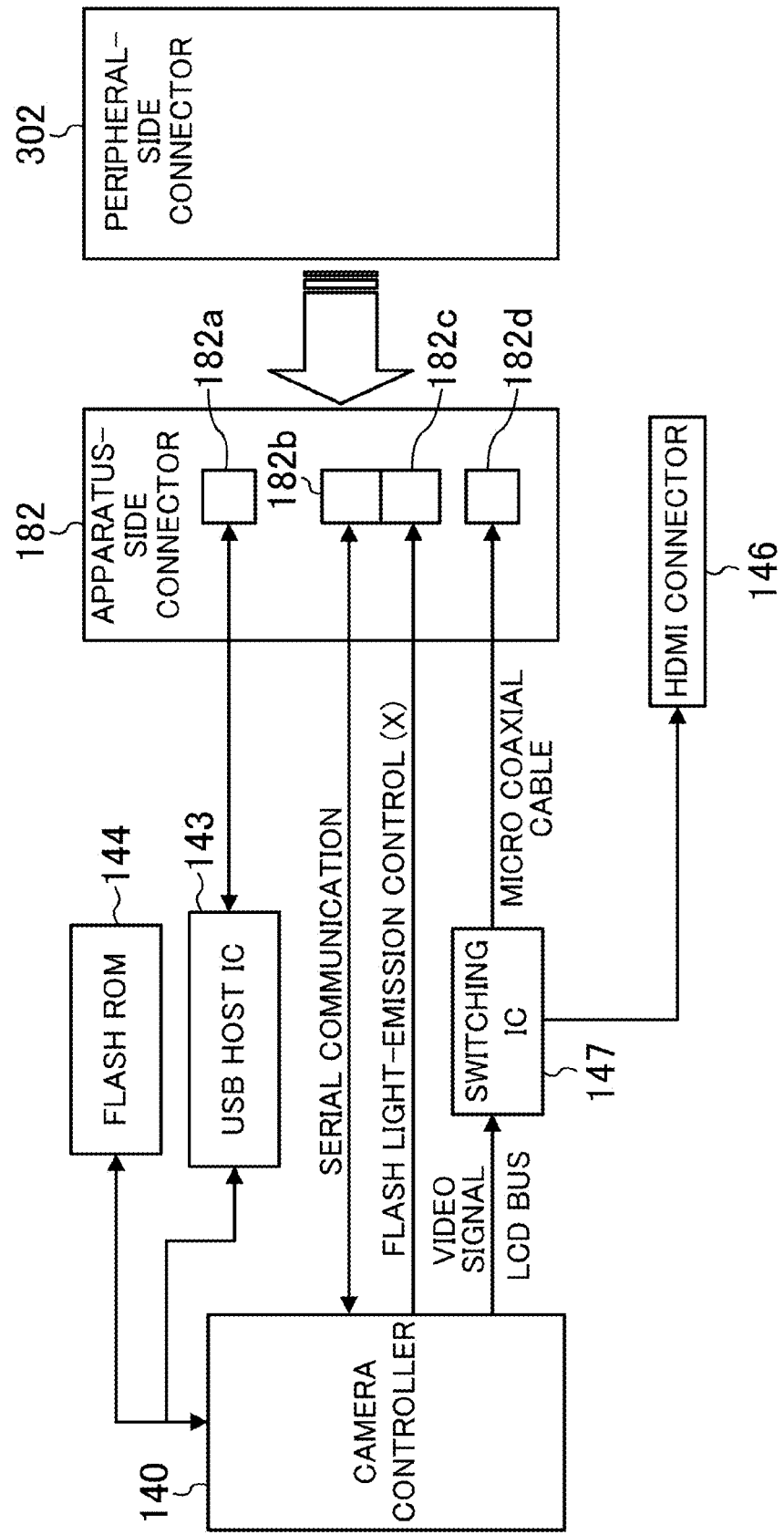
FIG. 8 is a block diagram illustrating another circuit configuration relating to an electrical connection between the camera body and the accessory unit.

FIG. 8 illustrates another circuit configuration relating to an electrical connection between a camera body 100 and an accessory unit 300. The same reference numerals as those shown in FIG. 7 are used to represent equivalent element in the circuit configuration illustrated in FIG. 8, and the description thereof will not be repeated.

In the present circuit configuration, a camera controller 140 and a video terminal 182d are connected together through a switching IC 147. The switching IC 147 is configured to selectively supply, depending on an operation command from a user, an HDMI video signal(s) (parallel video signal(s)) output from the camera controller 140 through an LCD bus to the video terminal 182d or an HDMI connector (HDMI terminal) 146. In the present circuit configuration, a video signal(s) to be supplied to the video terminal 182d is not a video signal(s) for which serial conversion is performed, but a parallel video signal(s).

The switching IC 147 may be configured so as to, when a cable is not connected to the HDMI connector 146, supply an HDMI video signal(s) from the camera controller 140 to the video terminal 182d, and may be configured so as to, when it is detected that the cable is connected to the HDMI connector 146, supply an HDMI video signal from the camera controller 140 to the HDMI connector 146.

Since noise is likely to occur in an HDMI video signal(s) due to disturbance such as spurious radiation, the switching IC 147 and the video terminal 182d may be connected together through a micro coaxial cable, or the switching IC 147 and the HDMI connector 146 may be connected together through a micro coaxial cable. Considering noise reduction, a parallel video signal(s) may be converted into a serial video signal(s) as in the circuit configuration illustrated in FIG. 7.

Figure 9:
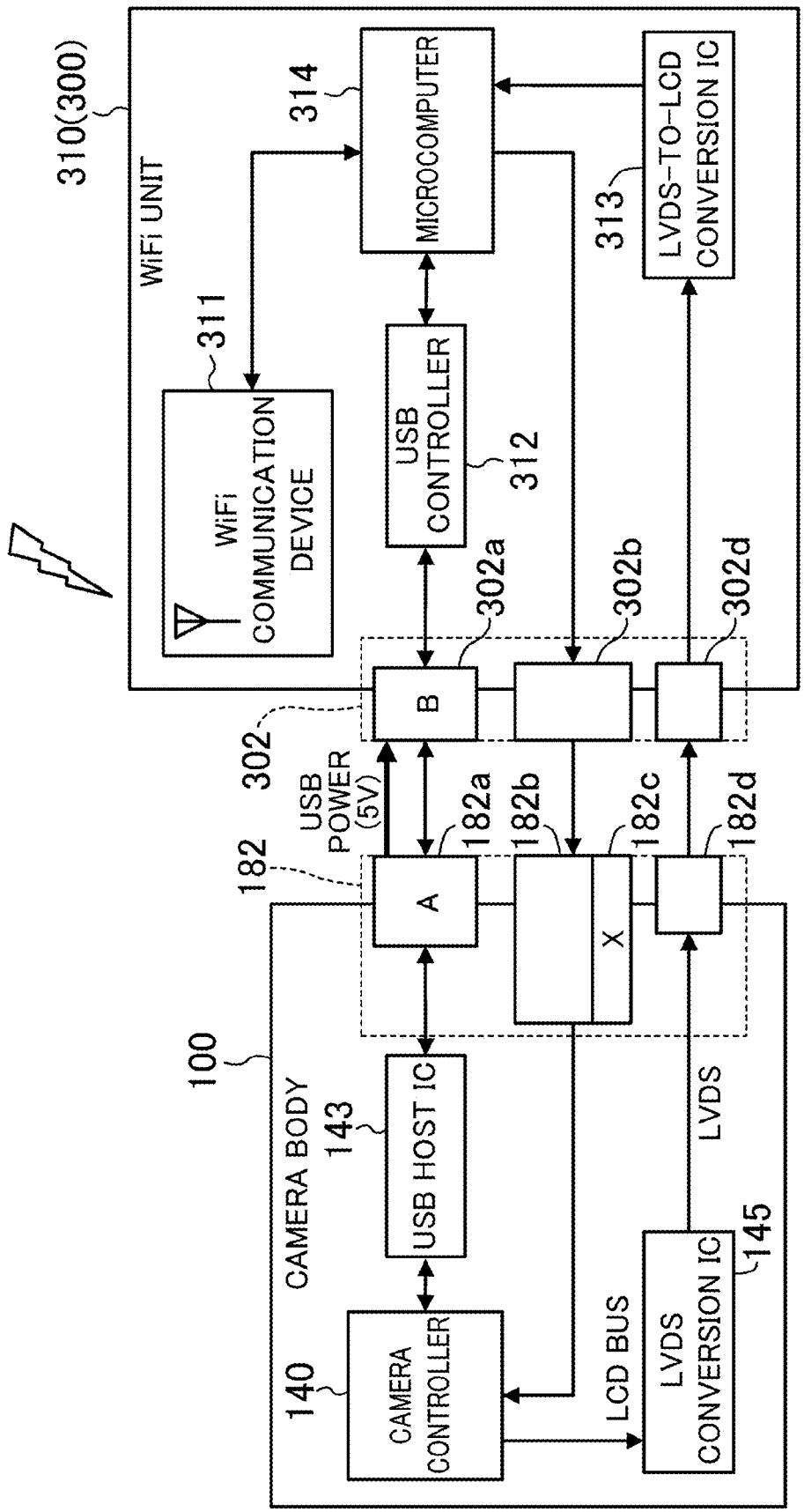
FIG. 9 is a block diagram illustrating still another circuit configuration relating to a connection between the camera body and a WiFi unit which is an example of the accessory unit.

FIG. 9 illustrates a circuit configuration relating to a connection between a camera body 100 and a WiFi unit 310 which is an example of the accessory unit 300.

A circuit configuration of the camera body 100 illustrated in FIG. 9 is similar to that illustrated in FIG. 7. Note that a flash ROM 144 is not shown in FIG. 9. In addition, a flash light-emission control line has nothing to do with the connection between the camera body 100 and the WiFi unit 310, and therefore is not shown in FIG. 9.

In a peripheral-side connector 302 of the WiFi unit 310, the followings are provided: a USB terminal 302a to be electrically connected to a USB terminal 182a of an apparatus-side connector 182 upon attachment of the WiFi unit 310 to a hot shoe 180; a control terminal 302b to be electrically connected to a flash terminal 182b upon the attachment of the WiFi unit 310 to the hot shoe 180; and a video terminal 302d to be electrically connected to a video terminal 182d upon the attachment of the WiFi unit 310 to the hot shoe 180. Note that a terminal to be electrically connected to a flash terminal (X-sync contact) 182c is provided only in a flash-related unit such as a flash unit 330 and a general-purpose hot shoe adapter 350 which will be described later (see a light emission terminal 302c illustrated in FIGS. 11 and 13).

The connection between the USB terminal 182a and the USB terminal 302a allows a supply of USB power (5V) from the camera body 100 to the WiFi unit 310 through the USB terminals 182a, 302a, and the WiFi unit 310 is, as a peripheral, connected to the camera body 100 serving as a host. In FIG. 9, a character "A" illustrated with the USB terminal 182a indicates a host side, and a character "B" illustrated with the USB terminal 302a indicates a peripheral side.

The WiFi unit 310 includes a WiFi communication device 311, a USB controller 312, an LVDS-to-LCD conversion IC 313, and a microcomputer 314 connected to each of the foregoing components.

The USB terminal 302a is connected to the microcomputer 314 through the USB controller 312, and the USB controller 312 is controlled by the microcomputer 314. In addition, the control terminal 302b is connected to the microcomputer 314, and the video terminal 302d is connected to the microcomputer 314 through the LVDS-to-LCD conversion IC 313.

The WiFi communication device 311 is configured to transmit/receive a wireless signal(s) for a WiFi connection to/from a communication terminal 315 such as a smartphone or a tablet PC, and is controlled by the microcomputer 314. The communication terminal 315 is not limited to the smartphone or the tablet PC, and may be a terminal which is capable of transmitting/receiving a wireless signal(s) for the WiFi connection to/from the WiFi communication device 311.

The LVDS-to-LCD conversion IC 313 is configured to input a serial video signal(s) for which serial conversion is performed, from an LVDS conversion IC 145 of the camera body 100 through the video terminals 182d, 302d. In addition, the LVDS-to-LCD conversion IC 313 is configured to convert the serial video signal(s) into a parallel video signal(s) and output the parallel video signal(s) to the microcomputer 314. The microcomputer 314 controls the WiFi communication device 311 and causes the WiFi communication device 311 to transmit the parallel video signal(s) to the communication terminal 315. In the communication terminal 315, a video picture (live view image which is an image shot by the camera body 100, a shot still image, or a shot moving image) corresponding to the parallel video signal(s) transmitted from the WiFi communication device 311 is displayed on a displayer of the communication terminal 315.

When the WiFi unit 310 is attached to the hot shoe 180, USB power (5V) is supplied to the WiFi unit 310 through the USB terminals 182a, 302a. In such a manner, the circuits including the circuit of the microcomputer 314 etc. are actuated in the WiFi unit 310. Upon the actuation of the circuits, the microcomputer 314 transmits a type signal(s) indicating that the accessory unit 300 attached to the hot shoe 180 is the WiFi unit 310, to the camera controller 140 through the control terminal 302b, the flash terminal 182b, and the serial communication signal line. The camera controller 140 receives the type signal(s), and recognizes that the WiFi unit 310 is attached to the hot shoe 180.

A user carrying the communication terminal 315 can perform various operations relating to actuation of the camera body 100 by operating the communication terminal 315, and an operation signal(s) corresponding to the various operations is input to the microcomputer 314 through the WiFi communication device 311. The microcomputer 314 controls the USB controller 312, and causes the USB controller 312 to transmit a command signal(s) corresponding to the operation signal(s) to the camera controller 140 through a USB host IC 143. The camera controller 140 receives the command signal(s), and performs a predetermined operation corresponding to the command signal(s). Note that the microcomputer 314 is capable of transmitting the command signal(s) to the camera controller 140 through the control terminal 302b, the flash terminal 182b, and the serial communication signal line.

The operation of the communication terminal 315 by the user allows a live view image which is an image shot by the camera body 100 to be transmitted to the communication terminal 315 through the WiFi unit 310 and be displayed on the displayer of the communication terminal 315. Then, when the user commands a release operation by operating the communication terminal 315 while viewing the live view image, the camera controller 140 receives a release operation signal(s) and shoots an image as in the case where a release button 131 is operated. The shot image is displayed on the displayer of the communication terminal 315 by operating the communication terminal 315.

As described above, by attaching the WiFi unit 310 to the hot shoe 180, a user can remotely shoot an image, i.e., can shoot an image from a position apart from an installation location of the camera system 1.

Figure 10:
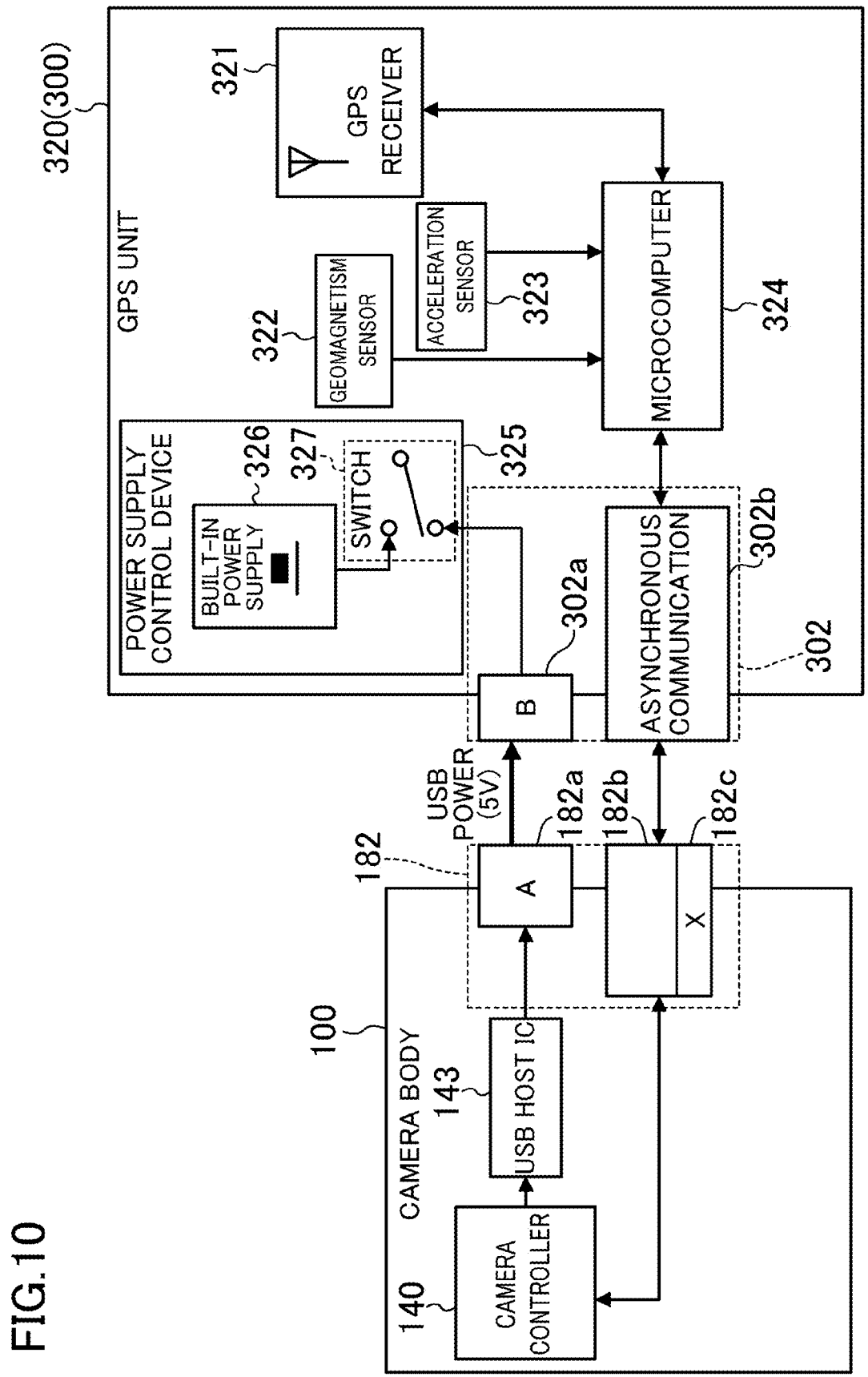
FIG. 10 is a block diagram illustrating still another circuit configuration relating to a connection between the camera body and a GPS unit which is another example of the accessory unit.

FIG. 10 illustrates a circuit diagram relating to a connection between a camera body 100 and a GPS unit 320 which is an example of the accessory unit 300.

A circuit configuration of the camera body 100 illustrated in FIG. 10 is similar to that illustrated in FIG. 7. Note that a flash ROM 144 is not shown in FIG. 10. In addition, a flash light-emission control line and circuits (LVDS conversion IC 145 etc.) relating to video signal output have nothing to do with the connection between the camera body 100 and the GPS unit 320, and therefore are not shown in FIG. 10.

In a peripheral-side connector 302 of the GPS unit 320, the followings are provided: a USB terminal 302a to be electrically connected to a USB terminal 182a of an apparatus-side connector 182 upon attachment of the GPS unit 320 to a hot shoe 180; and a control terminal 302b to be electrically connected to a flash terminal 182b upon the attachment of the GPS unit 320 to the hot shoe 180. A video terminal 302d is not provided in the peripheral-side connector 302 of the GPS unit 320.

The connection between the USB terminal 182a and the USB terminal 302a allows a supply of USB power (5V) from the camera body 100 to the GPS unit 320 through the USB terminals 182a, 302a, and the GPS unit 320 is, as a peripheral, connected to the camera body 100 serving as a host.

The GPS unit 320 includes a GPS receiver 321 configured to catch signals from a plurality of satellites and obtain a position information, a geomagnetism sensor 322 configured to detect an orientation, an acceleration sensor 323 configured to detect a vertical inclination, a microcomputer 324 configured to control the GPS receiver 321, and a power supply control device 325 including a built-in power supply 326.

The GPS unit 320 is attached to the hot shoe 180 in order to add position information etc. to a shot image. For the foregoing purpose, it is necessary that the GPS unit 320 constantly obtain position information. However, since it is necessary that the GPS unit 320 catches signals from the plurality of satellites by the GPS receiver 321, it is extremely difficult to obtain position information as soon as the GPS unit 320 is started. Thus, even if the camera body 100 is powered OFF (USB power is not supplied to the GPS unit 320), it is necessary to start the GPS unit 320.

The built-in power supply 326 is provided in the GPS unit 320, and therefore the GPS unit 320 can be started by the built-in power supply 326 even if the camera body 100 is powered OFF.

In the present example embodiment, a switch 327 is provided in the power supply control device 325. The switch 327 is configured to switch between the state in which the GPS unit 320 is started by the built-in power supply 326 and the state in which the GPS unit 320 is started by USB power. A user may manually switch between the foregoing states by using the switch 327. However, for the foregoing purpose, the switch 327 may be automatically switched to the state in which the GPS unit 320 is started by the built-in power supply 326 when the camera body 100 is powered OFF, and switched to the state in which the GPS unit 320 is started by USB power when the camera body 100 is powered ON and the USB power is supplied to the GPS unit 320.

Position information from the GPS receiver 321 and detection information from the geomagnetism sensor 322 and the acceleration sensor 323 are input to the microcomputer 324. The microcomputer 324 transmits such information to a camera controller 140 through the control terminal 302b, the flash terminal 182b, and a serial communication signal line. At this point, asynchronous communication is performed such that timing of transmitting/receiving information is synchronized between the GPS unit 320 and the camera body 100.

When the GPS unit 320 is attached to the hot shoe 180, the microcomputer 324 transmits a type signal(s) indicating that the accessory unit 300 attached to the hot shoe 180 is the GPS unit 320, to the camera controller 140 through the control terminal 302b, the flash terminal 182b, and the serial communication signal line. The camera controller 140 receives the type signal(s), and recognizes that the GPS unit 320 is attached to the hot shoe 180.

When a user shoots an image by operating a release button 131, the camera controller 140 transmits a request signal(s) to the microcomputer 324 through the serial communication signal line, the flash terminal 182b, and the control terminal 302b. Upon receipt of the request signal(s), the microcomputer 324 transmits position information and detection information obtained at this point to the camera controller 140.

FIG. 11 illustrates a circuit configuration relating to an electrical connection between a camera body 100 and a flash unit (external strobe) 330 which is an example of the accessory unit 300.

A circuit configuration of the camera body 100 illustrated in FIG. 11 is similar to that illustrated in FIG. 7. Note that a flash ROM 144 is not shown in FIG. 11. In addition, circuits (LVDS conversion IC 145 etc.) relating to video signal output have nothing to do with the connection between the camera body 100 and the flash unit 330, and therefore are not shown in FIG. 11.

In a peripheral-side connector 302 of the flash unit 330, the followings are provided: a USB terminal 302a to be electrically connected to a USB terminal 182a of an apparatus-side connector 182 upon attachment of the flash unit 330 to a hot shoe 180; a control terminal 302b to be electrically connected to a flash terminal 182b upon the attachment of the flash unit 330 to the hot shoe 180; and a light emission terminal 302c to be electrically connected to a flash terminal (X-sync contact) 182c upon the attachment of the flash unit 330 to the hot shoe 180. In the peripheral-side connector 302 of the flash unit 330, a video terminal 302d is not provided.

The connection between the USB terminal 182a and the USB terminal 302a allows a supply of USB power (5V) from the camera body 100 to the flash unit 330 through the USB terminals 182a, 302a, and the flash unit 330 is, as a peripheral, connected to the camera body 100 serving as a host.

The flash unit 330 includes a light emitter 331, a chargeable light emitting circuit 333 including a capacitor 332 and configured to charge the capacitor 332 and cause, by electrical discharge, the light emitter 331 to emit light, and a charge control circuit 334 configured to control the charging of the capacitor 332. The charge control circuit 334 performs serial communication with a camera controller 140 through the control terminal 302b, the flash terminal 182b, and a serial communication signal line.

A power supply is not provided in the flash unit 330 for the purpose of placing priority on size reduction of the flash unit 330. Thus, a circuit for charging the capacitor 332 with power supplied from a power supply 160 arranged in the camera body 100 to the chargeable light emitting circuit 333 is provided in the camera body 100. Note that such a circuit is not shown in FIGS. 7-10 and FIGS. 12 and 13 which will be described later.

That is, a switch circuit 161 including an FET is connected to a flash light-emission control line. The camera controller 140 controls opening/closing of the switch circuit 161 through a control IC 162. When the switch circuit 161 is in an open state, the capacitor 332 is not charged. On the other hand, when the switch circuit 161 is in a closed state, power is supplied from the power supply 160 of the camera body 100 to the chargeable light emitting circuit 333 through the flash terminal 182c and the light emission terminal 302c to charge the capacitor 332.

When the flash unit 330 is attached to the hot shoe 180, USB power (5V) is supplied to the charge control circuit 334 of the flash unit 330 through the USB terminals 182a, 302a. Then, the charge control circuit 334 transmits a type signal(s) indicating that the accessory unit 300 attached to the hot shoe 180 is the flash unit 330, to the camera controller 140 through the control terminal 302b, the flash terminal 182b, and the serial communication signal line. The camera controller 140 receives the type signal(s), and recognizes that the flash unit 330 is attached to the hot shoe 180.

When the camera controller 140 recognizes that the flash unit 330 is attached to the hot shoe 180, the camera controller 140 controls, through the control IC 162, the switch circuit 161 to be in the closed state. In such a manner, power is supplied from the power supply 160 of the camera body 100 to the capacitor 332 to charge the capacitor 332. Then, when the capacitor 332 is fully charged, the charge control circuit 334 transmits a charge completion signal(s) to the camera controller 140 through the control terminal 302b, the flash terminal 182b, and the serial communication signal line. The camera controller 140 which has received the charge completion signal(s) controls, through the control IC 162, the switch circuit 161 to be in the open state. In such a manner, the charging of the capacitor 332 is stopped.

Upon shooting using the flash unit 330, the camera controller 140 supplies a flash light-emission control signal(s) to the chargeable light emitting circuit 333 through the flash light-emission control line, the flash terminal 182c, and the light emission terminal 302c. In such a manner, the capacitor 332 discharges, and the light emitter 331 emits light. After the light emission, the camera controller 140 re-controls, through the control IC 162, the switch circuit 161 to be in the closed state, and the capacitor 332 is charged.

Figure 12:
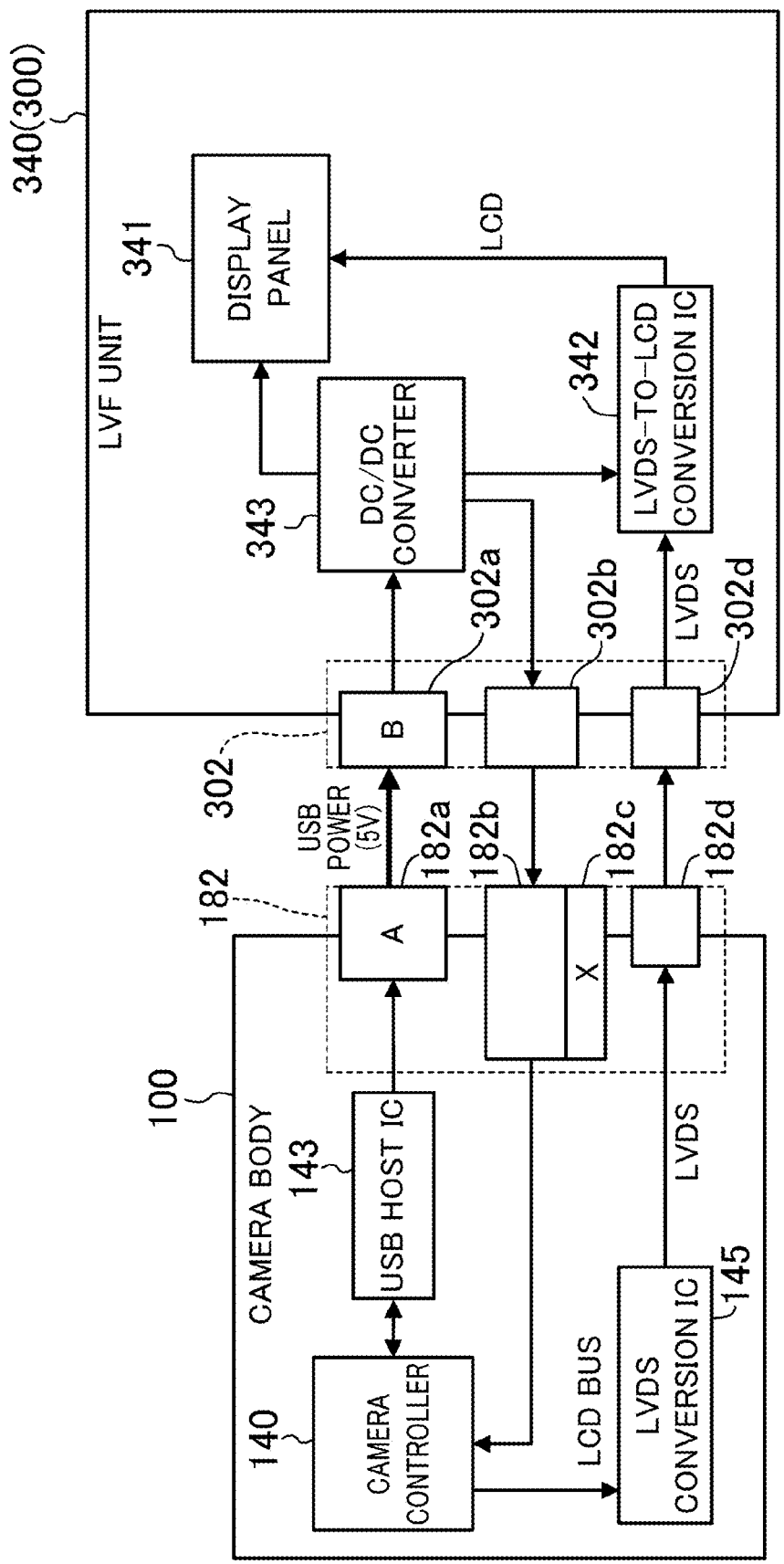
FIG. 12 is a block diagram illustrating still another circuit configuration relating to an electrical connection between the camera body and a live view finder unit which is still another example of the accessory unit.

FIG. 12 illustrates a circuit configuration relating to a connection between a camera body 100 and a live view finder unit 340 (hereinafter referred to as an "LVF unit 340") which is an example of the accessory unit 300.

A circuit configuration of the camera body 100 illustrated in FIG. 12 is similar to that illustrated in FIG. 7. Note that a flash ROM 144 is not shown in FIG. 12. In addition, a flash light-emission control line has nothing to do with the connection between the camera body 100 and the flash unit 330, and therefore is not shown in FIG. 12.

In a peripheral-side connector 302 of the LVF unit 340, the followings are provided: a USB terminal 302a to be electrically connected to a USB terminal 182a of an apparatus-side connector 182 upon attachment of the LVF unit 340 to a hot shoe 180; a control terminal 302b to be electrically connected to a flash terminal 182b upon the attachment of the LVF unit 340 to the hot shoe 180; and a video terminal 302d to be electrically connected to a video terminal 182d upon the attachment of the LVF unit 340 to the hot shoe 180.

The connection between the USB terminal 182a and the USB terminal 302a allows a supply of USB power (5V) from the camera body 100 to the LVF unit 340 through the USB terminals 182a, 302a, and the LVF unit 340 is, as a peripheral, connected to the camera body 100 serving as a host.

The LVF unit 340 includes a display panel 341 configured to display a live view image which is an image shot by the camera body 100, an LVDS-to-LCD conversion IC 342, and a DC/DC converter 343. As in the LVDS-to-LCD conversion IC 313 of the WiFi unit 310, the LVDS-to-LCD conversion IC 342 is configured to receive a serial video signal(s) for which serial conversion is performed, from an LVDS conversion IC 145 of the camera body 100. In addition, the LVDS-to-LCD conversion IC 342 is configured to convert the serial video signal(s) into a parallel video signal(s) and output the parallel video signal(s) to the display panel 341. On the display panel 341, a video picture (live view image) corresponding to the parallel video signal(s) is displayed.

The DC/DC converter 343 is configured to convert USB power (5V) supplied from the camera body 100 into predetermined voltage required for driving the display panel 341 and supply the voltage to the display panel 341. In addition, the DC/DC converter 343 is configured to convert the USB voltage (5V) into predetermined voltage required for driving the LVDS-to-LCD conversion IC 342 and supply the voltage to the LVDS-to-LCD conversion IC 342. Further, the DC/DC converter 343 is configured to transmit, as a type signal(s) indicating that the accessory unit 300 attached to the hot shoe 180 is the LVF unit 340, voltage at a GND level to the camera controller 140 through the control terminal 302b, the flash terminal 182b, and a serial communication signal line.

When the LVF unit 340 is attached to the hot shoe 180, USB power (5V) is supplied to the DC/DC converter 343 of the LVF unit 340 through the USB terminals 182a, 302a. Then, the DC/DC converter 343 transmits, as a type signal(s), voltage at the GND level to the camera controller 140 through the control terminal 302b, the flash terminal 182b, the serial communication signal line. The camera controller 140 which has received the type signal(s) recognizes that the LVF unit 340 is attached to the hot shoe 180, and outputs a live view image to the display panel 341 through the LVDS conversion IC 145, the video terminals 182d, 302d, and the LVDS-to-LCD conversion IC 342. In such a manner, a user can view the live view image on a display panel of the LVF unit 340.

Figure 13:
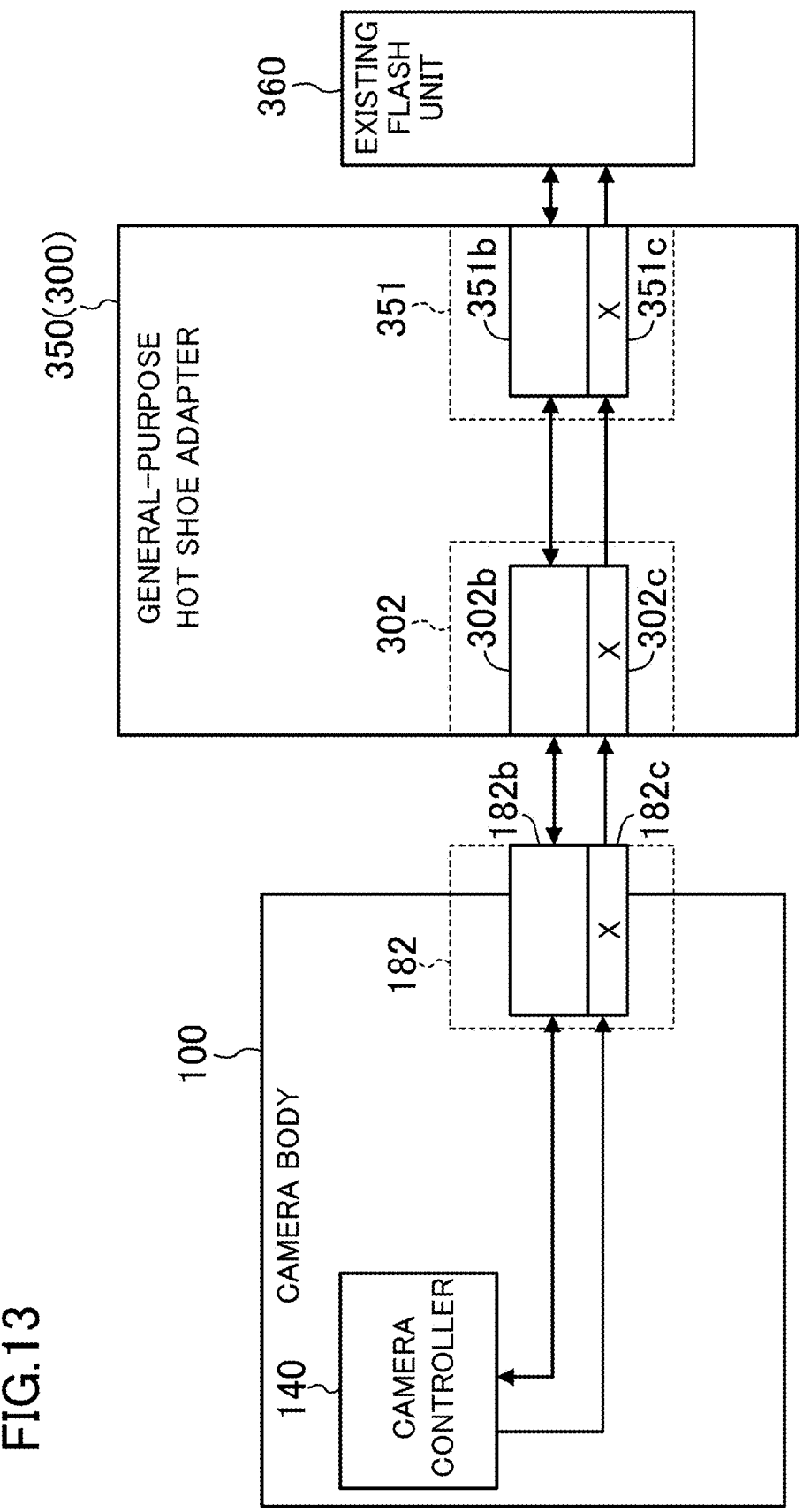
FIG. 13 is a block diagram illustrating still another circuit configuration relating to an electrical connection between the camera body and a general-purpose hot shoe adapter which is still another example of the accessory unit.

FIG. 13 illustrates a circuit configuration relating to an electrical connection between a camera body 100 and a general-purpose hot shoe adapter 350 which is an example of the accessory unit 300.

A circuit configuration of the camera body 100 illustrated in FIG. 13 is similar to that illustrated in FIG. 7. Note that a flash ROM 144 is not shown in FIG. 13. In addition, circuits (USB host IC 143 etc.) relating to a USB and circuits (LVDS conversion IC 145 etc.) relating to video signal output have nothing to do with the connection between the camera body 100 and the general-purpose hot shoe adapter 350, and therefore are not shown in FIG. 13.

The general-purpose hot shoe adapter 350 is an adapter for attaching an existing flash unit 360 which is attachable to an existing hot shoe, to a hot shoe 180 having a form different from that of the existing hot shoe. The attachment of the existing flash unit 360 to the hot shoe 180 through the general-purpose hot shoe adapter 350 allows shooting using the existing flash unit 360. Note that a power supply is provided in the existing flash unit 360.

An existing hot shoe 351 is provided in the general-purpose hot shoe adapter 350, and flash terminals 351b, 351c are provided in the existing hot shoe 351. The flash terminals 351b, 351c are connected respectively to corresponding terminals of the existing flash unit 360.

In a peripheral-side connector 302 of the general-purpose hot shoe adapter 350, the followings are provided: a control terminal 302b to be electrically connected to a flash terminal 182b upon the attachment of the general-purpose hot shoe adapter 350 to the hot shoe 180; and a light emission terminal 302c to be electrically connected to a flash terminal (X-sync contact) 182c upon the attachment of the general-purpose hot shoe adapter 350 to the hot shoe 180. The control terminal 302b is connected to the flash terminal 351b through a serial communication signal line, and the light emission terminal 302c is connected to the flash terminal 351c through a flash light-emission control line. Thus, the flash terminal 351c functions as the X-sync contact. In the peripheral-side connector 302 of the general-purpose hot shoe adapter 350, a USB terminal 302a and a video terminal 302d are not provided.

Although the general-purpose hot shoe adapter 350 which is not attached to the existing flash unit 360 is attached to the hot shoe 180, a camera controller 140 does not recognize that the general-purpose hot shoe adapter 350 is attached to the hot shoe 180. However, when the general-purpose hot shoe adapter 350 which is attached to the existing flash unit 360 is attached to the hot shoe 180, a type signal(s) from the existing flash unit 360 is input to the camera controller 140 through the general-purpose hot shoe adapter 350 and the serial communication signal line of the camera body 100, and therefore the camera controller 140 recognizes that the general-purpose hot shoe adapter 350 is, together with the existing flash unit 360, attached to the hot shoe 180.

The existing flash unit 360 is configured to charge a capacitor of a chargeable light emitting circuit by the power supply of the existing flash unit 360. Thus, the camera controller 140 maintains the switch circuit 161 illustrated in FIG. 11 in an open state. Upon the shooting using the existing flash unit 360, the camera controller 140 transmits a flash light-emission control signal(s) to the chargeable light emitting circuit of the existing flash unit 360 through the general-purpose hot shoe adapter 350 and the flash light-emission control line of the camera body 100. In such a manner, the capacitor of the existing flash unit 360 discharges, and a light emitter emits light.

Thus, in the present example embodiment, since an apparatus-side connector 182 and the peripheral-side connector 302 are electrically connected together by attaching the accessory unit 300 to the hot shoe 180, no inconvenience is caused to a user. In addition, since the USB terminal 182a and the video terminal 182d having high versatility are provided in the apparatus-side connector 182 in addition to the flash terminals 182b, 182c to which a flash control signal(s) is supplied, the various accessory units 300 such as the WiFi unit 310, the GPS unit 320, and the LVF unit 340 can be employed in addition to the flash unit 330.

For newly-proposed accessory units 300, lower compatibility is allowed by firmware update of the driver software stored in, e.g., the flash ROM 144, and a user can enjoy using the new accessory units 300 on all occasions.

Thus, the versatility of the imaging apparatus is extremely high, and no inconvenience is caused to a user. In addition, a cost for the imaging apparatus is low, and future system expansion for the imaging apparatus can be facilitated.

The camera controller 140 receives a signal(s) initially output after the attachment of the accessory unit 300 to the hot shoe 180, from the accessory unit 300 through the flash terminal 182b and the serial communication signal line, and identifies the type of the accessory unit 300 attached to the hot shoe 180 based on the received initial signal(s). Thus, the accessory unit 300 attached to the hot shoe 180 can be identified with a simple configuration, and a proper control for the accessory unit 300 attached to the hot shoe 180 can be realized.

The present disclosure is not limited to the foregoing example embodiment, and replacements can be made without departing from the spirit of the appended claims.

For example, in the foregoing example embodiment, the apparatus-side connector 182 is provided in the inner region of the hot shoe 180 (in the region of the hot shoe 180 between the key grooves 181), but may be provided an adjacent region outside the hot shoe 180. For example, the apparatus-side connector 182 may be provided in an adjacent region below the hot shoe 180 such that the opening of the case of the apparatus-side connector 182 opens at a rear surface of the camera body 100.

The foregoing example embodiment has been set forth merely for the purpose of examples in nature, and is not intended to limit the scope of the subject matter defined in the claims. The scope of invention is defined by the appended claims, and modifications and changes that fall within the proper scope of the claims appropriately interpreted in accordance with the doctrine of equivalents and other applicable judicial doctrines are made within the scope of the subject matter defined in the claims.

What is claimed is:

1. An imaging apparatus including a hot shoe to which one of a plurality of peripheral devices including an external strobe is selectively attachable, the imaging apparatus comprising:
   a USB controller which is operable as a USB host;
   a flash controller configured to output a flash control signal for controlling the external strobe; and
   a video signal controller configured to output a video signal,
   wherein an apparatus-side connector to be electrically connected to a peripheral-side connector provided in a corresponding one of the peripheral devices upon attachment of the corresponding one of the peripheral devices to the hot shoe is provided in an inner region of the hot shoe,
   the apparatus-side connector includes a USB terminal connected to the USB controller and receiving a signal from the USB controller, a flash terminal connected to the flash controller and receiving a flash control signal from the flash controller, and a video terminal connected to the video signal controller and receiving a video signal from the video signal controller,
   each of the peripheral devices is configured so as to be attached to the hot shoe by sliding from one side to other side in a predetermined direction, and to be detached from the hot shoe by sliding back to the one side in the predetermined direction,
   the apparatus-side connector includes a cylindrical case formed with an opening facing the one side in the predetermined direction, and
   the apparatus-side connector is configured so as to
      be electrically connected to the peripheral-side connector in such a manner that the peripheral-side connector slides, upon the attachment of the corresponding one of the peripheral devices to the hot shoe, toward the other side in the predetermined direction to be inserted into the case through the opening thereof, and
      be electrically disconnected from the peripheral-side connector in such a manner that the peripheral-side connector slides, upon detachment of the corresponding one of the peripheral devices from the hot shoe, back toward the one side in the predetermined direction to be removed from the case.

2. The imaging apparatus of claim 1, wherein
   the flash controller receives a signal initially output after attachment of one of the peripheral devices to the hot shoe, from the one of the peripheral devices through the flash terminal.

3. The imaging apparatus of claim 2, wherein
   the flash controller identifies a type of the one of the peripheral devices upon receipt of the signal.

4. The imaging apparatus of claim 1, wherein
the video signal to be supplied to the video terminal is a video signal for which serial conversion is performed.

5. The imaging apparatus of claim 1, wherein
the video signal to be supplied to the video terminal is an HDMI video signal.

6. The imaging apparatus of claim 5, wherein
the HDMI video signal is selectively supplied to the video terminal or an HDMI terminal provided in part of the imaging apparatus other than part of the imaging apparatus where the apparatus-side connector is provided.

7. The imaging apparatus of claim 1, wherein
the hot shoe includes a pair of key grooves facing each other in a direction perpendicular to the predetermined direction so as to sandwich the apparatus-side connector and extending in the predetermined direction, and
a pair of keys engaged respectively with the pair of key grooves and sliding along the key grooves are provided in each of the peripheral devices.

8. The imaging apparatus of claim 7, wherein
the key grooves are formed by a base member surrounding the apparatus-side connector and a plate member, and
the plate member is, as viewed in a direction perpendicular to both of a direction in which the pair of key grooves face each other and the predetermined direction, formed in such a shape that the plate member surrounds the apparatus-side connector with exception of part of the apparatus-side connector on the one side in the predetermined direction.

* * * * *